April 9, 1935.  G. C. ALSTAD ET AL  1,997,032
PASTEURIZING MACHINE
Filed Feb. 15, 1930  4 Sheets-Sheet 1

Inventors:
George C. Alstad
John H. Baumgartner
By Harry C. Alberts
Atty.

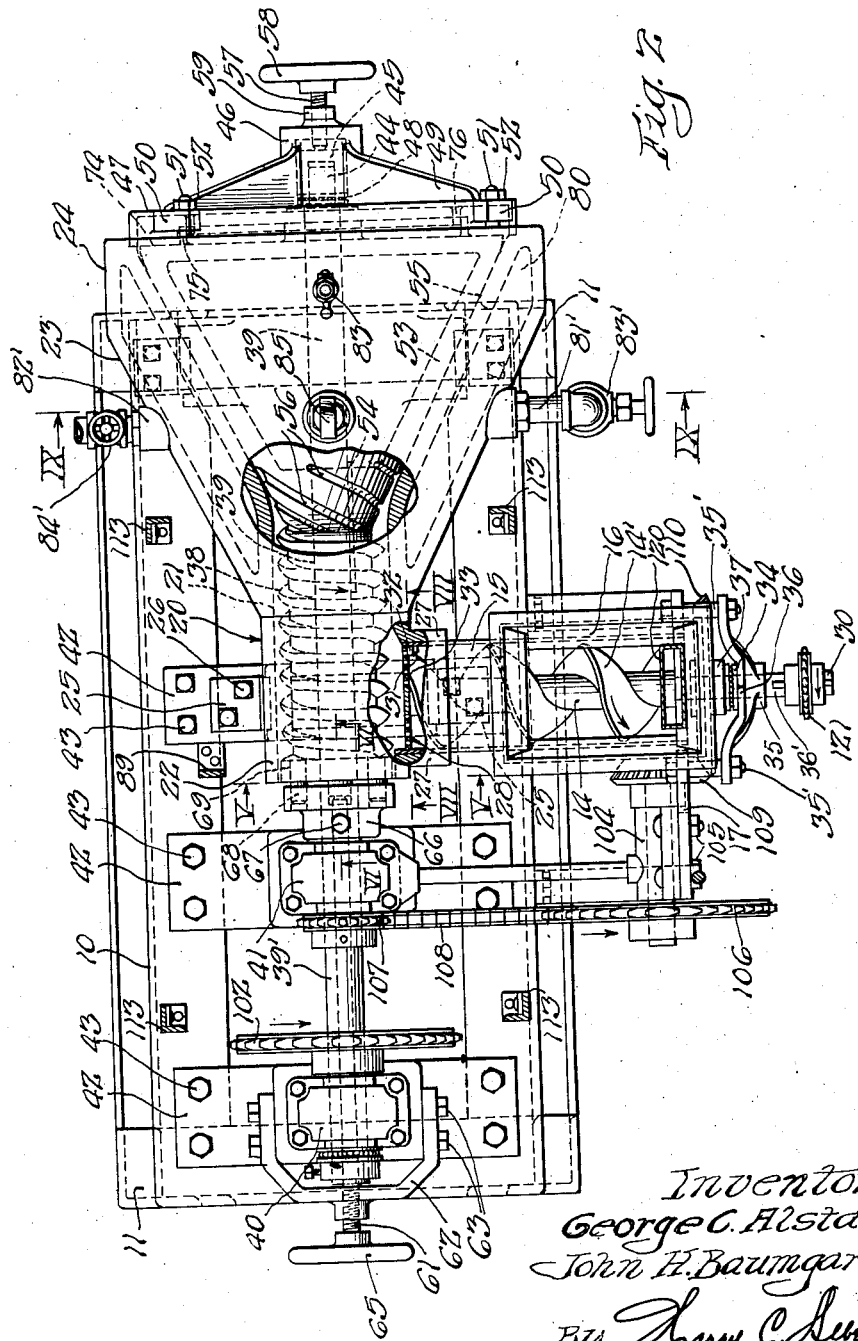

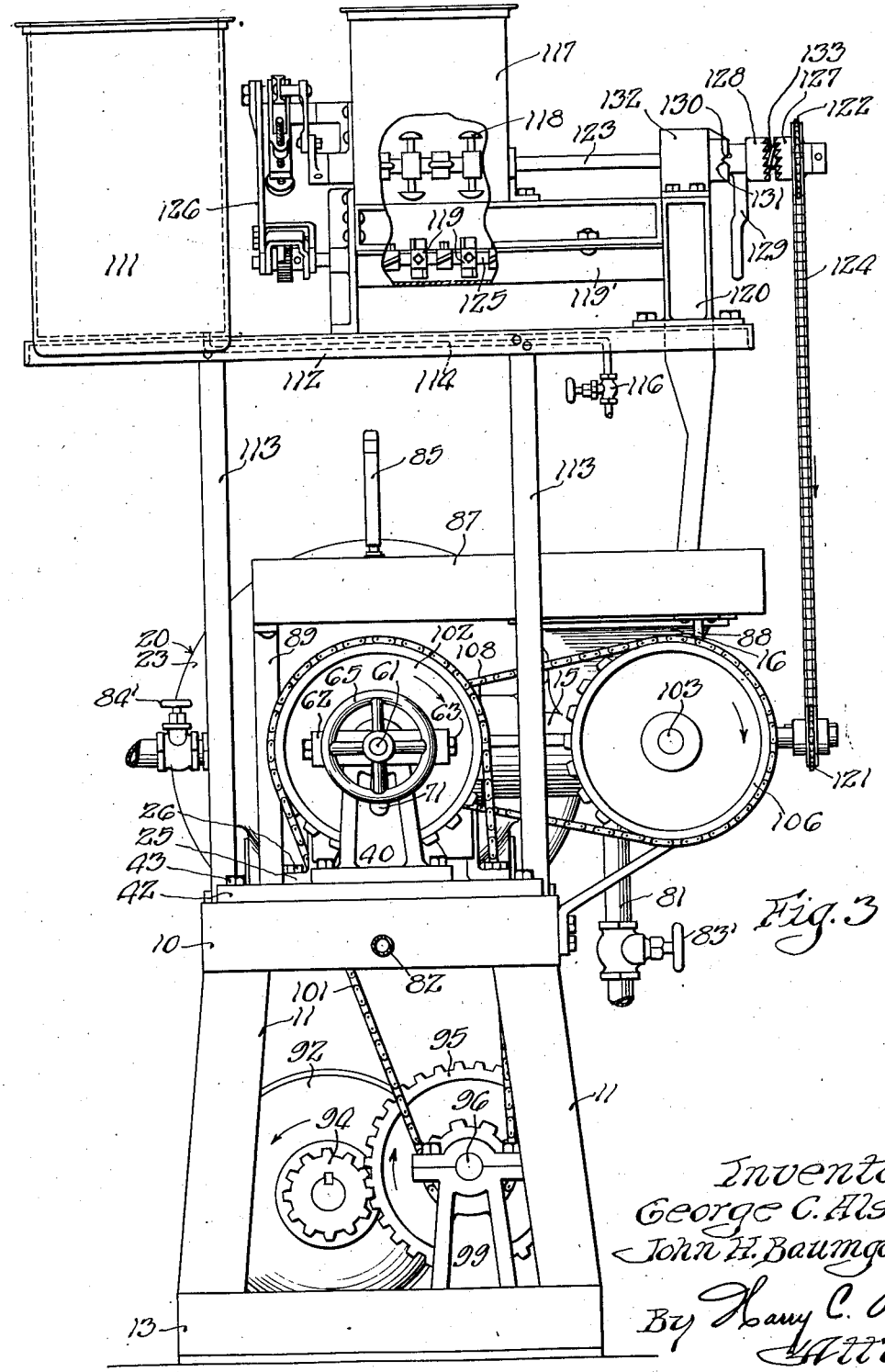

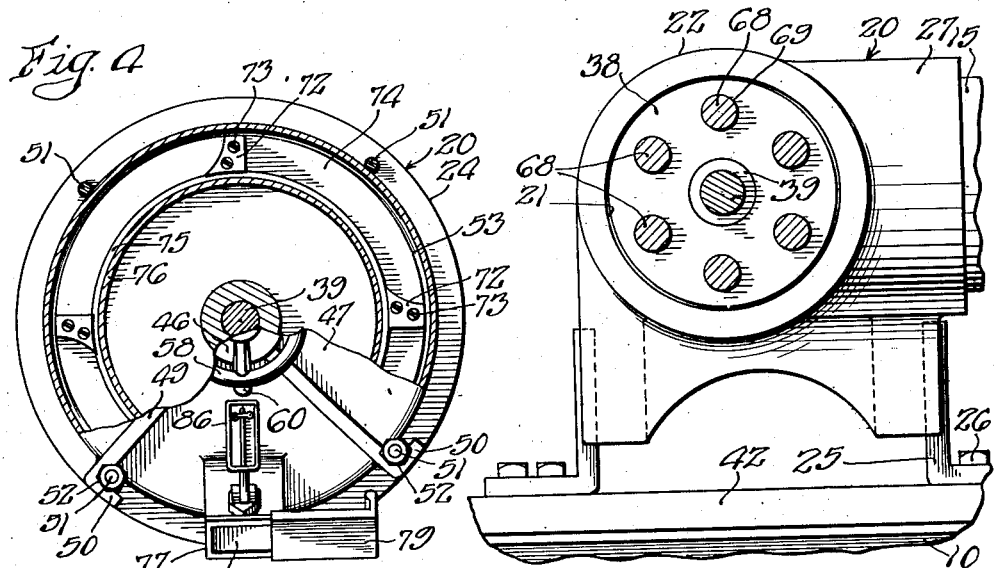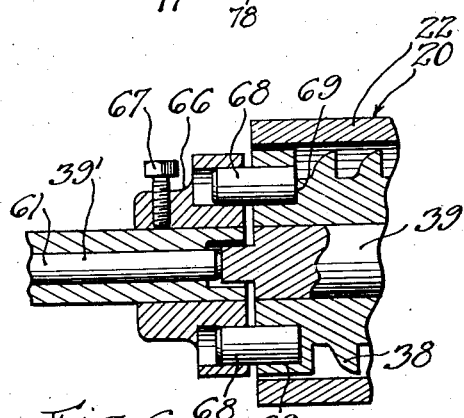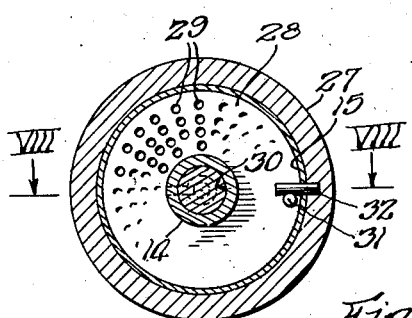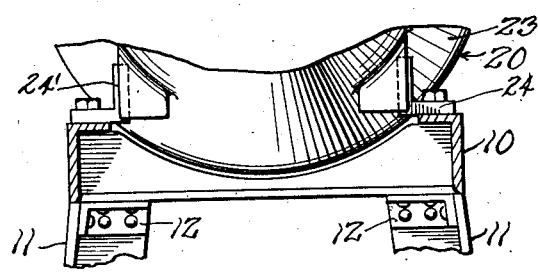

Patented Apr. 9, 1935

1,997,032

UNITED STATES PATENT OFFICE 1,997,032

PASTEURIZING MACHINE

George C. Alstad and John H. Baumgartner, Chicago, Ill., assignors, by mesne assignments, to Doering Research & Development Corporation, a corporation of Illinois Application February 15, 1930, Serial No. 428,619

15 Claims. (Cl. 99—2)

This invention relates to pasteurizing devices and more particularly to machines for imparting keeping qualities to edible substances such as cheese, although it may be employed with equal advantage for other purposes.

It contemplates more especially the provision of means for mechanically pasteurizing dairy plastics without resort to extraneous heat, thereby insuring against disintegration or casein separation to the end of accomplishing complete homogeneity incident to imparting maximum keeping qualities thereto.

Dairy products such as cheese, butter and kindred edible plastics are customarily pasteurized by the subjection thereof to elevated temperatures prior to packaging. Pasteurization tends to preclude or at least retard deterioration occasioned by bacteria infestation responsive to natural bacteria decay over an extended period of time. Fundamentally the difficulty of pasteurizing cheese or other dairy products with heat is the inability to prevent disintegration of the constituents or the separation of the butter fat from the casein, thereby destroying the homogeneity thereof. It has long been the practice, therefore, of employing mechanical agitators and stirring implements during heat pasteurization to prevent disintegration, but such expedients require skilled supervision and constant regulation not always productive of uniformity.

As a consequence the known devices for effecting pasteurization which require the subjection of the dairy products to heat supplied from some extraneous source, have not acquired perfection from both the standpoint of production costs and uniformity in the resulting product. The present invention departs entirely from known processes in the heat of pasteurization is produced incident to the processing of dairy products to insure complete homogeneity and increased smoothness of texture without skilled supervision and regulation. Moreover, edible dairy plastics are kept intact by the adhesive character of the adjacent particles; however, such masses are subject to fracture responsive to impact or the severance of a portion thereof with a knife or other utensil when not uniform in texture, thereby destroying the contour and mass continuity thereof.

It has been found advantageous to produce long attenuated strings of such substances in its critical or sterilized condition especially of cheese which is not sufficiently plastic in certain of its forms for mass retention under chilling temperatures. The production of linear attenuated strings results in interweaving which effects tenacious adhering association of the normally plastic constituents. This enables the slicing or segmental severance thereof under all conditions without destroying the continuity of the mass.

Dairy products are especially appetizing when possessing a fine velvety consistency in that such possess a decidedly improved taste owing to the complete homogenized condition thereof which results from processing in accordance with the teachings of the present invention. The keeping qualities and texture thereof are enhanced even more by resort to primarily mechanical rather than thermal processing to impart an accentuated velvety homogenous consistency to the natural plastic product and maximum keeping qualities.

One object of the present invention is the provision of means for pasteurizing dairy products which insure complete homogeneity without constant skilled supervision.

Another object is to provide means for effecting pasteurization incident to imparting complete homogeneity to dairy products without resort to extraneous heat.

Still another object is the provision of means for improving dairy products by mechanical rather than extraneous heat pasteurization.

A further object is the provision of an improved edible plastic by the subjection thereof to a mechanical pressure reaction.

A still further object is to provide novel mechanical means for processing edible plastics to improve the preserving and taste qualities thereof.

Still a further object is the provision of a novel combination of elements for mechanically rather than thermally processing edible substances resulting in a superior product having extended keeping qualities, and improved taste.

An additional object is to provide means for producing frictional heat of pasteurization incident to processing cheese to a complete homogeneous edible substance possessing keeping qualities.

Other objects and advantages will appear from the following description of an illustrated embodiment of the present invention.

In the drawings:

Figure 2 is a plan view of the device shown in Figure 1.

Figure 3 is a rear view of the device shown in Figure 1.

Figure 4 is a front view of the pasteurizing drum with the cap therefor broken away to clarify the disclosure.

Figure 5 is a sectional view taken substantially along line V—V of Figure 2.

Figure 6 is a sectional view taken substantially along line VI—VI of Figure 2.

Figure 7 is a sectional view taken substantially along line VII—VII of Figure 2.

Figure 8 is a sectional view taken substantially along line VIII—VIII of Figure 7.

Figure 9 is a sectional view taken substantially along line IX—IX of Figure 2.

Figure 1:
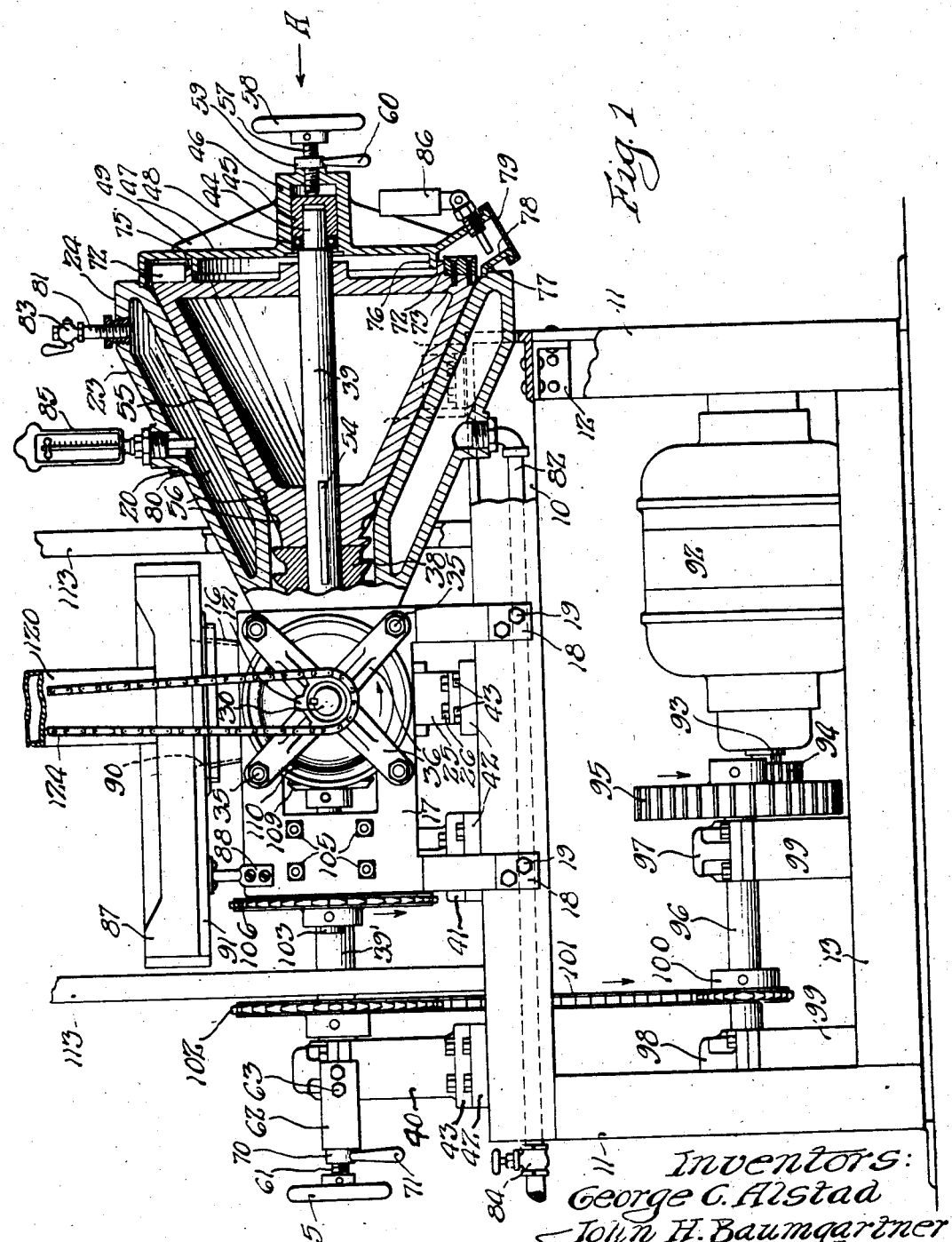
Figure 1 is a side view in elevation of a device embodying features of the present invention.

The structure selected for illustration comprises a substantially rectangular frame 10 of any suitable construction which is elevated from the floor or other foundation by means of corner standards 11 riveted or otherwise joined thereto in the customary manner with angle irons 12. Cross members 13 extend between the standards 11 near the base thereof to reinforce the frame structure 10 in providing a rigid and non-vibrating support for instrumentalities to be hereinafter described. In order to feed edible substances along a predetermined path, a spiral screw conveyor 14 is, in this instance, disposed transversely of the frame 10 for rotary support in a housing 15. As shown, the housing 15 has a flaring orifice 16 which extends in a vertically upward direction for communication with the interior thereof to direct the substance from any suitable source of supply to the conveyor 14. To this end, the housing 15 is attached to a plate 17 having depending extensions 18 for lateral secural to the side wall of the frame 10 by means of fasteners 19. The other end of the housing 15 is in communication with a pasteurizing housing 20 having an interior circular bore 21 disposed normal to the screw 14 to further convey the substance for processing as will more clearly appear hereinafter.

The pasteurizing housing 20 has, in this instance, a cylindrical entrant portion 22 which extends longitudinally of the frame 10 for termination in a frusto-conical body 23 having a cylindrical end portion 24, it resting upon the frame 10 near the enlarged discharge end thereof for attachment by brackets 24' with the diminished entrant portion 22 maintained in horizontal alignment by upstanding brackets 25 secured to the frame 10 by means of fasteners 26. It is to be noted that the entrant portion 22 has an annular boss 27 extending transversely of the bore 21 in communication therewith to telescopically receive the housing 15, thereby enabling passage of the substance from the latter to the pasteurizing house 20 responsive to the rotation of the conveyor screw 14. In order to shread or comminute the edible substance such as cheese prior to its entrance in the pasteurizing housing 20, a circular plate 28 is mounted against rotation at the juncture of the annular boss 27 with the entrant portion 22 thereof. For this purpose, the plate 28 is provided with a plurality of apertures 29 over the entire area thereof so as to permit the cheese or other substance to be extruded therethrough responsive to the relative rotation of the conveyor screw 14.

To this end, the plate 28 is provided with an axial bore 30 to receive the extremity of the conveyor 14 which is journalled therein with the other extremity thereof similarly journalled in an aligned bore provided in the plate 17. To preclude rotation of the perforated plate 28, a pin 31 extends therefrom near the periphery thereof for obstruction by a similarly shaped pin 32 extending normal thereto from the interior wall of the boss 27 thereby holding the plate 28 against rotation so that the substance will be extruded therethrough in that the extremity 33 of the screw of the conveyor blade 14' bears thereagainst to sever the extruded substance from the mass confined within the housing 15. In consequence thereof, counter clockwise rotation (viewed from Figure 1) imparted to the screw conveyor 14 will feed the substance lodged within the flaring orifice 16 along a predetermined path or axially of the housing 15 for extrusion through the apertures 29 of the plate 28 to the pasteurizing housing 20 in comminuted form. In order to properly sustain the screw conveyor 14 for rotation with minimum friction, an end thrust bearing 34 is carried by a cap 35 having normally extending arms 36 to effect the support thereof from the plate 17 owing to carriage bolts 35' which extend therebetween, thereby rotatively supporting the shaft extremity 36' of the screw conveyor 14 so that a collar 37 affixed thereto will bear against the bearing 34 to preclude axial movement or displacement as well as to provide the necessary end thrust with minimum friction.

The edible plastics or substances taken directly from the churn or storage where aging is permitted to impart a predetermined strength thereto or in the instance of butter to effect preserved freshness under reduced temperatures, are then directed to the hopper or entrant orifice 16 of the housing 15 for grinding or comminution, in this instance incident to the discharge thereof, to the housing 20. The substance is then subjected to a physical pressure reaction which elevates the temperature for mechanical pasteurization. In the present embodiment heat of pasteurization is developed mechanically incident to the passage of the substance through a constriction or between surfaces in frictional reaction to effect pasteurization during the movement thereof along a predetermined path. This is accomplished by passing the substance in comminuted condition through a constriction of any type where heat will be involved as a consequence thereof. In order to effect the traverse of the substances through a constriction for creating heat of pasteurization incident to the traverse thereof, the cylindrical portion 22 of the housing 20 is provided with a conveyor, in this instance a screw conveyor 38, which is mounted upon a shaft 39 having a segregated portion 39' thereof journalled in spaced split bearings 40 and 41 sustained upon cross plates 42 which are secured to the top of the frame 10 in any suitable manner such as by fasteners 43. The forward extremity 44 of the shaft 39 is journalled in an end bearing 45 carried in a housing 46 constituting an integral portion of an end closure 47 for the open extremity 24 of the pasteurizing housing 20. It is to be noted that an end thrust bearing 48 is carried in the bearing housing 46 to enable the shaft 39 to be journalled at spaced points for rotary support with minimum turning resistance offered thereto.

The closure 47 is provided with radially extending ribs 49 formed integral therewith for extension beyond the periphery thereof to define end hooks 50 complemental to studs 51 which extend from the lateral face of the pasteurizing housing rim 24, thereby enabling the association and disassociation of the closure responsive to a slight rotary displacement thereof. In order to maintain the closure 47 in its operating position against displacement, nuts or other fasteners 52 are threaded for engagement with the studs 51 to bear against the hooks 50, thereby securing the closure 47 against removal.

As shown, the conveyor 38 terminates in a conical rotor 53 splined or otherwise fixed to the shaft 39 by means of a key 54 for rotation therewith in frictional contact with the correspondingly shaped interior surface 55 of the pasteurizing body 23 simultaneous with the passage of the edible substances therebetween serving as a frictional reacting medium, thereby defining a minute constriction therebetween for the passage of the edible substance from the conveyor 38 which is in communication with helical convolutions in the form of grooves 56 provided in the entrant region of the rotor 53 to enable or institute the travel of substance between the relatively moving contacting or pressure reacting surfaces 53 and 55. The extent of the constriction defined between the surfaces 53 and 55 may be modified to conform with the required heat of pasteurization through the medium of a shank 57 which is threaded axially through the central housing 46 of the closure 47 to bear against the bearing 45 to effect longitudinal movement of the shaft 39 in the threaded direction (arrow A—Figure 1) responsive to the rotating end wheel 58 fixed to the extremity of the shaft 57 in any suitable manner. A nut 59 threaded to the shank 57 is engaged with the housing 46 responsive to manipulating a lever 60 integrally formed therewith, thereby locking the shank 57 against accidental rotation or displacement to maintain the bearing 45 in the desired position. In order to effect axial movement of the rotor 53 in a direction opposite to arrow A (Figure 1) a similar adjusting screw or shank 61 is threaded in a forked bracket 62 fixed to the bearing 40 by means of fasteners 63 so that the threaded shank 61 will extend through the axial bored shaft 39' to engage the adjacent extremity of the shaft 39 extending in axial alignment therewith. In consequence thereof, rotation imparted to the threaded shank 61 by means of a hand wheel 65 attached to the extremity thereof will enable the enlargement of the constriction defined between the rotor 53 and its corresponding surface 55 constituting the interior of the pasteurizing housing 20 or afford the entire removal of the rotor 53 for cleansing purposes without disturbing the shaft 39' so that rotation imparted to the shaft 39' may be transmitted to the shaft 39 in alignment therewith. A flanged hub 66 is fixed to the extremity of the shaft 39' by means of a set screw 67 for rotation in unison therewith. A plurality of pins 68, in this instance six, are suitably anchored for extension from the lateral face of the hub 66 for cooperation with correspondingly shaped and spaced apertures 69 provided in the adjacent face of the worm or spiral conveyor 38 to establish an operative connection precluding relative rotation therebetween and affording axial movement for disengagement in the event the movement of the rotor 53 should be found necessary or desirable. A threaded nut 70 engages the threaded portion of the shank 61 to serve as a lock nut in engagement with the forked bracket 62 responsive to manipulating the lever 71 constituting an integral portion of the nut 70, thereby precluding accidental displacement of the rod 61.

Rotation of the shaft 39' which imparts corresponding rotation to the shaft 38 owing to the pin clutch connectors 68 extending therebetween, will effect the traverse of the comminuted substance along the conveyor 38 to the spirally arranged curved groove 56 about the entrant periphery of the rotor 53 on the conically arcuate surface thereof to cooperate with the correspondingly shaped surface 55 of the casing body 23, the groove 56 being circumferentially spaced at uniform intervals for extension beyond the inclination of the interior of the pasteurizing housing 20 to effect initial passage of the plastic particles from the cylindrical portion 22 thereof. In consequence thereof, continued rotation of the rotor 53 in unison with the conveyor 38 will effect the travel of the plastic substances through the constriction defined between the contacting or frictional reacting surfaces of the rotor 53 and interior 55 of the housing 20 which are in direct contact for developing heat of pasteurization responsive to the rotation of the former with respect to the latter. The substances are thus subjected to a pressure reaction which in conjunction with the frictional contact of the relatively moving surfaces, elevates the temperature of the moving substances to a point of pasteurization. The degree of temperature elevation and the maintenance thereof at a predetermined magnitude may be controlled by the distance of the rotor 53 with respect to the interior surface 55 of the housing section 23 responsive to adjusting or manipulating the end wheels 58 and/or 65 as conditions may require or deem advisable. During this passage of the plastic particles, heat of pasteurization is developed incidental to the rotation of the rotor 53 which also serves to effect movement thereof to its periphery for discharge. It is thus apparent that the use of extraneous heat such as steam or any other vapor or liquid thermal medium is entirely avoided, and the processing effected in a manner which imparts complete homogeneity to the resulting product without any possible disintegration or separation of the elements or their composition. Discharge of the substances from the constriction is effected primarily by the centrifugal urge imparted thereto and effective thereon at the periphery responsive to the rotation thereof; however, any accumulation on the periphery of the rotor 53 owing to the adhering character thereof, is removed by expelling members 72 in the form of projections, in this instance four, secured by means of fasteners 73 to the lateral wall 74 of the rotor 53 near the periphery thereof for movement in an annular channel 75. The annular channel 75 is formed in the confronting face of the closure 47 owing to an annular ridge 76 radially spaced from the periphery thereof, thereby expelling the pasteurized substance through a discharge orifice 77 formed by a spout 78 which integrally depends from the closure 47 for communication with the annular channel 75. A suitable gate 79 comprising, in this instance, a slidable closure is adjustably associated with the extremity of the discharge orifice 77 to govern the flow of the substance therethrough for placement in any suitable container as commercial practice may dictate.

Obviously, it is necessary or at least highly desirable to remove the initial chill from the material comprising the sterilizing housing 20 and rotor 53 so that frictional heat of pasteurization may be developed instantaneously responsive to the rotation of the rotor 53. To this end, it has been found feasible and effective to provide a water jacket 80 within the wall of the frusto-conical midsection or body 23 of the housing 20. For this purpose a water inlet 81 is suitably threaded to any portion of the housing 20 for communication with the water jacket 80 so that a suitable medium may be circulated therein for discharge through a pipe or other outlet 82 in threaded communication therewith at a point remote to the inlet 81. The inlet 81 and outlet 82 may be suitably valved as at 83 and 84 so as to control the amount of flow of a thermal medium such as hot water therethrough in elevating the temperature of the metal casting to a degree sufficient to permit instantaneous development of frictional heat responsive to the rotation of the rotor 53. For that matter, the water jacket 80 may later be furnished with cold water to regulate and control the maximum temperature of the housing 20 responsive to the frictional rotation of the rotor 53 therewith. Circulation of cold water through the jacket 80 may be accomplished by providing an inlet 81' and an outlet 82' which are suitably valved as at 83' and 84' in positions other than the warm water inlet and outlet 81 and 82, thereby enabling one or the other sets of inlet and outlet to be connected to different sources of water supply for either elevated or diminished temperature control.

So that the temperature may be known and controlled, a thermometer 85 is suitably mounted or attached to the jacketed section 23 of the housing 20 in thermal communication with the jacket 80 to designate the temperature thereof. Similarly, a thermometer 86 is attached to the discharge spout 78 for communication with the interior 77 thereof so that the temperature of the issuing or pasteurized products may be known and controlled to produce the best and most effective result from the standpoint of homogeneity and the keeping quality of the resulting product. In order to enable the cheese or other substance to be supplied to the orifice 16 of the housing 15, a substantially rectangular receptacle 87 is mounted thereabove by means of standards 88 and 89 which depend to the plate 17 and frame 10, respectively, to effect the rigid horizontal support thereof. A suitable opening 90 corresponding in dimensional extent and contour to the orifice 16 is provided in the bottom 91 of the receptacle 87 for communication therewith so that a large volume of the cheese or other substance to be processed may be conveniently and readily supplied to the housing 15 for traverse and feeding along a predetermined path in a manner described supra. The various instrumentalities necessary for effecting the pasteurization and processing without resort to extraneous heat are operated from a single source of power, in this instance an electric motor 92 supported beneath the frame 10 for secural thereto in any appropriate manner to prevent displacement.

The armature shaft 93 of the motor 92, carries a pinion 94 which meshes with a spur gear 95 fixed for rotation in unison with a stub shaft 96 journalled in bearings 97 and 98 carried by brackets 99 fixed to the same foundation and in horizontal alignment with the base or foundation of the motor 92. A sprocket wheel 100 is fixed to the shaft 96 between the bearings 97 and 98 thereof to drive a chain 101 which meshes with a sprocket wheel 102 fixed to the shaft 39' to effect the rotation thereof in a clockwise direction (viewed from Figure 3). In consequence thereof, corresponding movement or rotation is imparted to the conveyor 38 and the rotor 53 which is fixed to the shaft 39 in operative connection with the shaft 39' by virtue of the clutch 66 disposed therebetween. In order to simultaneously rotate the worm or spiral conveyor 14 in timed relation with the conveyor 38, a stub shaft 103 is journalled in a bearing 104 (Figure 2) fixed to the plate 17 by means of fasteners 105, there being a sprocket wheel 106 fixed to the shaft 103 for alignment with a sprocket wheel 107 carried by the shaft 39' to establish an operative connection therewith owing to an intervening chain 108. As shown, the stub shaft 103 terminates in a beveled gear 109 which meshes with a correspondingly shaped gear 110 carried by the shaft extremity 36 of the conveyor 14 to impart rotation thereto responsive to rotation of the shaft 39' occasioned by the energization of the electric motor 92. It will thus be apparent that the instrumentalities thus far described are motivated from a single source of energy or power, in this instance the electric motor 92.

To supply the necessary or desired moisture to the substance during or prior to the processing thereof, a water tank 111 is supported upon a platform 112 sustained above the frame 10 by means of standards 113. A pipe line 114 communicates with the interior of the water tank 111 for termination above the orifice 16 of the housing 15 to discharge any suitable liquid such as water thereto prior to processing. To regulate the flow of water and the degree of moisture desired in the resulting product, a valve 116 is provided in the pipe line 114 so that any amount of moisture may be incorporated to meet the requirements of the pure food laws as well as to preclude scorching during pasteurization should there be any such tendency at any time. It is well known to incorporate chemical preservatives and/or flavors such as Pimento in dairy or other edible substances prior or during their pasteurization. To this end, a chemical and/or flavor mixer 117 of standard construction and design is mounted upon the platform 112 so that the various propelling, mixing and even comminuting elements or devices 118 and 119 thereof may discharge the desired elements along a trough 119' in communication with a depending spout 120 which discharges the resulting product to the entrant orifice of the housing 15. To control and regulate the volume of substance incorporated in the cheese or other processed substances to acquire the desired uniformity in the resulting product, the propelling, mixing and comminuting instrumentalities 118 and 119 of the mixer 117 are rendered operative responsive to the rotation of the conveyor 14. In consequence thereof, a sprocket wheel 121 is mounted on the shaft extremity 36 of the conveyor 14 in alignment with a corresponding sprocket 122 fixed to a shaft 123 carrying the mixing instrumentalities 118 thereon. A chain 124 extends between the sprockets 121 and 122 in meshing engagement therewith so as to rotate the shaft 123 and impart rotation to the shaft 125 carrying the propelling instrumentality 119 of the mixer 117. A ratcheting device 126 operatively connects the shafts 123 and 125 of the mixing device 117, thereby effecting the operation thereof responsive to the energization of the motor 92 which controls the movement of the other instrumentalities described, supra, in connection with the frictional heat pasteurization constituting one of the primary features of the instant invention.

In order to render the mixer 117 operative or inoperative as commercial practice may require, complemental clutch elements 127 and 128 are provided upon the shaft 123 for idling thereon and fixed association therewith, respectively. The clutch element 128 which idles upon the shaft 123 is thrown into or out of engagement with its complemental element 127 by virtue of a lever 129 which has a camming surface 130 thereon to cooperate with a corresponding surface 131 constituting a part of the bearing 132 for the shaft 123. A spiral spring 133 envelops the shaft 123 between the clutch elements 127 and 128 to normally urge the separation thereof to maintain the mixer 117 inactive. Rotation of the lever 129, however, displaces the clutch element 128 in the direction of its complemental element 127 so as to establish a driving connection between the sprocket wheel 122 and the shaft 123.

Various changes may be made in the embodiment of the invention herein specifically described without departing from or sacrificing any of the advantages thereof as defined in the appended claims.

We claim:

1. In a device of the character described, the combination with means for feeding edible substances along a predetermined path, of confronting non-contacting surfaces disposed in said path to receive the edible substances serving as the frictional reacting medium therebetween, and means for imparting relative movement to said surfaces, said surfaces being substantially non-interrupted and of sufficient expanse for effecting pasteurization incident to the passage of the substances therebetween.

2. In a device of the character described, the combination with a conveyor for feeding substances along a predetermined path, of means for comminuting the substances responsive to the operation of said conveyor, and friction means including the substances serving as an operative reacting medium developing heat of pasteurization and a spiral conveyor axially associated with said friction means for effecting substance passage therethrough.

3. In a device of the character described, the combination with a conveyor for feeding substances along a predetermined path, of means for comminuting the substances responsive to the operation of said conveyor, complemental conically shaped members in spaced non-contacting relation for frictional contact with the substances received therebetween, means for imparting relative rotation to said members to develop heat of pasteurization through the medium of the substances, and a spiral conveyor axially mounted for rotation with one of said members to feed the substance therebetween.

4. In a device of the character described, the combination with a conveyor for feeding substances along a predetermined path, of means for comminuting the substances responsive to the operation of said conveyor, complemental conically shaped members in spaced non-contacting relation for frictional contact with the substances received therebetween, means for imparting relative rotation to said members to develop heat of pasteurization through the medium of the substances, and a spiral conveyor axially mounted for rotation with one of said members to feed the substance therebetween, and means extending from said rotor for attachment proximate to the periphery thereof for effecting the discharge of the substance.

5. In a device of the character described, the combination with a conveyor for feeding substances along a predetermined path, of means for comminuting the substances responsive to the operation of said conveyor, complemental conically shaped members in spaced non-contacting relation for frictional contact with the substances received therebetween, means for imparting relative rotation to said members to develop heat of pasteurization through the medium of the substances, a spiral conveyor axially mounted for rotation with one of said members to feed the substance therebetween, and means attached to said rotor for extension therefrom in the path of said spaced members to remove the substances therefrom.

6. In a device of the character described, the combination with a conveyor for feeding substances along a predetermined path, of means for comminuting the substances responsive to the operation of said conveyor, complemental conically shaped members in spaced non-contacting relation for frictional contact with the substances received therebetween, means for imparting relative rotation to said members to develop heat of pasteurization through the medium of the substances, a spiral conveyor axially mounted for rotation with one of said members to feed the substance therebetween, means attached to said rotor for extension therefrom in the path of said spaced members to remove the substances therefrom, and an end closure having a discharge orifice disposed in the path of said substance removing means.

7. In a device of the character described, the combination with means for feeding edible substances along a predetermined path, of relatively movable surfaces defining a constriction in said path, means for imparting movement to said surfaces for extruding the substances through said constriction incident to producing frictional heat of pasteurization, a closure associated with the discharge end of said constriction, there being an annular groove in said closure for communication with said constriction, and a discharge spout formed in said closure for communication with said groove.

8. In a device of the character described, the combination with means for feeding edible substances along a predetermined path, of relatively movable surfaces defining a constriction in said path, means for imparting movement to said surfaces for extruding the substances through said constriction incident to producing frictional heat of pasteurization, a closure associated with the discharge end of said closure for communication with said constriction, a discharge spout formed in said closure for communication with said groove, and means movable with one of said surfaces in said annular closure groove to direct the substances from said constriction to said groove for discharge through said orifice.

9. In a device of the character described, the combination with means for feeding edible substances along a predetermined path, of relatively movable surfaces defining a constriction in said path, means for imparting movement to said surfaces for extruding the substances through said constriction incident to producing frictional heat of pasteurization, a closure associated with the discharge end of said closure for communication with said constriction, a discharge spout formed in said closure for communication with said groove, and means movable with one of said surfaces in said annular closure groove to direct the substances from said constriction to said groove for discharge through said orifice, and means for varying the substance capacity of said constriction for heat regulation.

10. In a device of the character described, the combination with means for feeding edible substances along a predetermined path, of relatively movable surfaces defining a constriction in said path, means for imparting movement to said surfaces for extruding the substances through said constriction incident to producing frictional heat of pasteurization, means for comminuting the substance for passage to said constriction, a closure associated with the discharge end of said closure for communication with said constriction, a discharge spout formed in said closure for communication with said groove, and means movable with one of said surfaces in said annular closure groove to direct the substances from said constriction to said groove for discharge through said orifice.

11. A cheese pasteurizing device comprising complemental members in spaced non-contacting relation, said members having confronting surfaces of substantially uninterrupted and sufficient expanse for frictional reaction with substances received therebetween to create heat of pasteurization, means for imparting relative rotation to said members to develop heat of pasteurization through the medium of said substances, and means for directing the substances between the surfaces of said members for the purpose set forth.

12. A cheese pasteurizing device comprising complemental conically shaped members in spaced non-contacting relation, said members having confronting surfaces of substantially uninterrupted and sufficient expanse for frictional reaction with substances received therebetween to create heat of pasteurization, means for imparting relative rotation to said members to develop heat of pasteurization through the medium of said substances, and means for directing the substances between the surfaces of said members for the purpose set forth.

13. A cheese pasteurizing device comprising complemental conically shaped members in spaced non-contacting relation, said members having confronting surfaces of substantially uninterrupted and sufficient expanse for frictional reaction with substances received therebetween to create heat of pasteurization, means for imparting relative rotation to said members to develop heat of pasteurization through the medium of said substances, and means axially mounted for rotation with one of said members for feeding the substances between the surfaces of said members for the purpose set forth.

14. A cheese pasteurizing device comprising complemental conically shaped members in spaced non-contacting relation, said members having confronting surfaces of substantially uninterrupted and sufficient expanse for frictional reaction with substances received therebetween to create heat of pasteurization, means for imparting relative rotation to said members to develop heat of pasteurization through the medium of said substances, and means axially mounted to the apex of one of said members to rotate therewith for directing the substances between the surfaces of said members for the purpose set forth.

15. A cheese pasteurizing device comprising complemental conically shaped members in spaced non-contacting relation, said members having confronting surfaces of substantially uninterrupted and sufficient expanse for frictional reaction with substances received therebetween, said conical members having a substantial pitch and a comparatively large base diameter that is effective to create heat of pasteurization at comparatively low speeds, means for imparting relative rotation to said members to develop heat of pasteurization through the medium of said substances, and means axially mounted to the apex of one of said members to rotate therewith for directing the substances between the surfaces of said members for the purpose set forth.

GEORGE C. ALSTAD.
JOHN H. BAUMGARTNER.